(12) United States Patent  
Flood et al.

(10) Patent No.: US 7,809,924 B2
(45) Date of Patent: *Oct. 5, 2010

(54) SYSTEM FOR GENERATING EFFECTIVE ADDRESS

(75) Inventors: Rachel Marie Flood, Austin, TX (US); Scott Bruce Frommer, Cold Spring, NY (US); David Allen Hrusecky, Cedar Park, TX (US); Sheldon B. Levenstein, Austin, TX (US); Michael Thomas Vaden, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 182 days.

This patent is subject to a terminal disclaimer.

(21) Appl. No.: 12/048,527

(22) Filed: Mar. 14, 2008

(65) Prior Publication Data

US 2008/0162887 A1    Jul. 3, 2008

Related U.S. Application Data

(63) Continuation of application No. 11/054,274, filed on Feb. 9, 2005, now Pat. No. 7,360,058.

(51) Int. Cl.
*G06F 12/00* (2006.01)

(52) U.S. Cl. ...................... 711/220; 711/202
(58) Field of Classification Search .................. 711/220
See application file for complete search history.

(56) References Cited

U.S. PATENT DOCUMENTS

| 5,335,333 | A | 8/1994 | Hinton et al. |
| 5,924,128 | A | 7/1999 | Luick et al. |
| 6,374,342 | B1 | 4/2002 | Sasahara |

*Primary Examiner*—Matt Kim
*Assistant Examiner*—Kaushikkumar Patel
(74) *Attorney, Agent, or Firm*—Yee & Associates, P.C.; Diana R. Gerhardt

(57) ABSTRACT

Method, system and computer program product for generating effective addresses in a data processing system. A method, in a data processing system, for generating an effective address includes generating a first portion of the effective address by calculating a first plurality of effective address bits of the effective address, and generating a second portion of the effective address by guessing a second plurality of effective address bits of the effective address. By intelligently guessing a plurality of the effective address bits that form the effective address, the effective address can be generated and sent to a translation unit more quickly than in a system in which all the effective address bits of the effective address are calculated. The method and system is particularly suitable for generating effective addresses in a CAM-based effective address translation design in a multi-threaded environment.

5 Claims, 4 Drawing Sheets

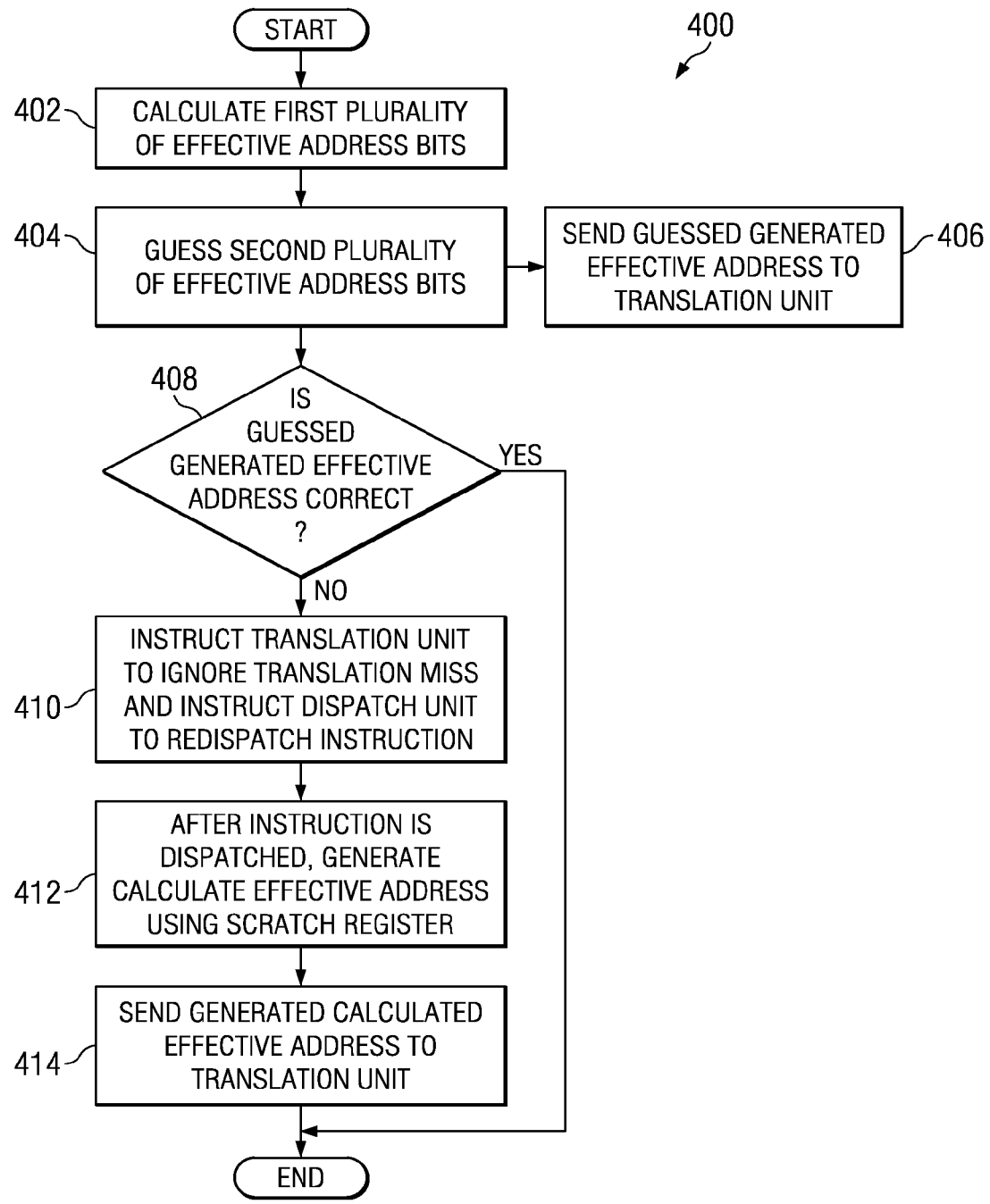

SYSTEM FOR GENERATING EFFECTIVE ADDRESS

This application is a continuation of application Ser. No. 11/054,274, filed Feb. 9, 2005 now U.S. Pat. No. 7,360,058.

BACKGROUND OF THE INVENTION

1. Technical Field

The present invention relates generally to the data processing field and, more particularly, to a method, system and computer program product for generating effective addresses in a data processing system.

2. Description of Related Art

In a central processing unit (CPU) having an effective address adder for generating effective addresses (EA) which need to be translated, it is important to get the effective addresses to the translation unit as quickly as possible. A CAM (Content-Addressable Memory)-based effective address translation design has been found to perform well, especially in a multi-threaded environment where the utilization of each thread varies dynamically between 0, 50% and 100%. Such a CAM-based effective address translation design, however, requires that all of the bits of the effective address be present at the same time.

One possible approach to generating effective addresses more quickly is to add a cycle into the critical path getting the address to the translation unit. This approach, however, will add a cycle to the cache data valid path, which can be problematic in many designs. Another alternative to generating effective addresses more quickly is to use a translation scheme that does not include a CAM-based translation design. This approach, however, may not provide the overall performance advantages realized by using a CAM-based translation design.

There is, accordingly, a need for a mechanism for generating effective addresses more quickly in a CAM-based effective address translation design.

SUMMARY OF THE INVENTION

The present invention provides a method, system and computer program product for generating effective addresses in a data processing system. A method, in a data processing system, for generating an effective address according to the invention includes generating a first portion of the effective address by calculating a first plurality of effective address bits of the effective address, and generating a second portion of the effective address by guessing a second plurality of effective address bits of the effective address. By intelligently guessing a plurality of the effective address bits that form the effective address, the effective address can be generated and sent to a translation unit more quickly than in a system in which all the effective address bits of the effective address are calculated. The invention is particularly suitable for generating effective addresses in a CAM-based effective address translation design in a multi-threaded environment.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 4 is a flowchart that illustrates a method for generating effective addresses in a data processing system according to a preferred embodiment of the present invention.

DETAILED DESCRIPTION OF THE PREFERRED EMBODIMENT

Figure 1:
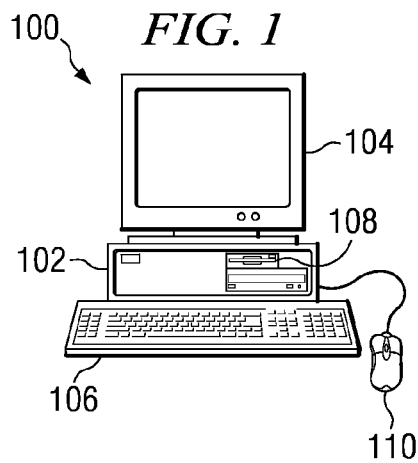
FIG. 1 is a pictorial representation of a data processing system in which the present invention may be implemented in accordance with a preferred embodiment of the present invention.

With reference now to the figures and in particular with reference to FIG. 1, a pictorial representation of a data processing system in which the present invention may be implemented is depicted in accordance with a preferred embodiment of the present invention. A computer 100 is depicted which includes system unit 102, video display terminal 104, keyboard 106, storage devices 108, which may include floppy drives and other types of permanent and removable storage media, and mouse 110. Additional input devices may be included with personal computer 100, such as, for example, a joystick, touchpad, touch screen, trackball, microphone, and the like. Computer 100 can be implemented using any suitable computer, such as an IBM eServer computer or IntelliStation computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface (GUI) that may be implemented by means of systems software residing in computer readable media in operation within computer 100.

Figure 2:
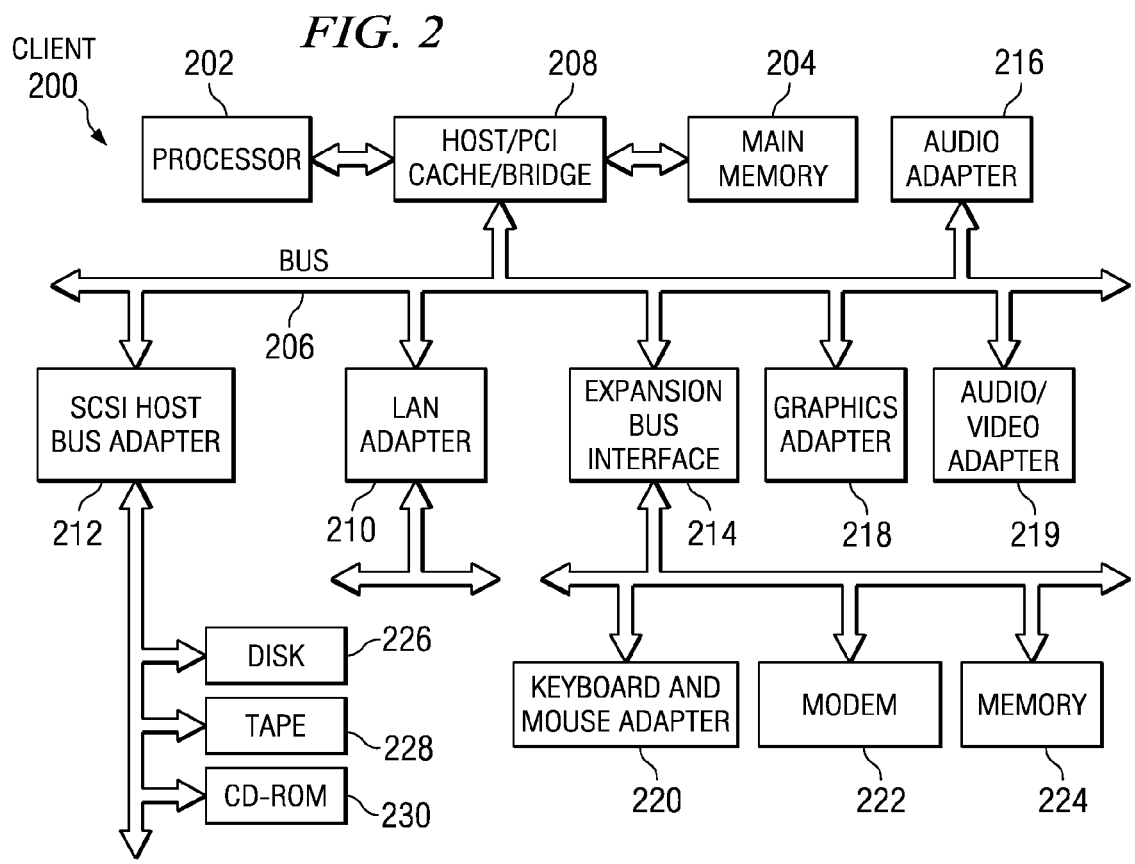
FIG. 2 is a block diagram of a data processing system in which the present invention may be implemented.

With reference now to FIG. 2, a block diagram of a data processing system is shown in which the present invention may be implemented. Data processing system 200 is an example of a computer, such as computer 100 in FIG. 1, in which code or instructions implementing the processes of the present invention may be located. Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in connectors. In the depicted example, local area network (LAN) adapter 210, small computer system interface (SCSI) host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system such as Windows XP, which is available from Microsoft Corporation. An object oriented programming system such as Java may run in conjunction with the operating system and provides calls to the operating system from Java programs or applications executing on data processing system 200. "Java" is a trademark of Sun Microsystems, Inc. Instructions for the operating system, the object-oriented programming system, and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash read-only memory (ROM), equivalent nonvolatile memory, or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include SCSI host bus adapter 212, hard disk drive 226, tape drive 228, and CD-ROM 230. In that case, the computer, to be properly called a client computer, includes some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface. As a further example, data processing system 200 may be a personal digital assistant (PDA), which is configured with ROM and/or flash ROM to provide non-volatile memory for storing operating system files and/or user-generated data.

The depicted example in FIG. 2 and above-described examples are not meant to imply architectural limitations. For example, data processing system 200 also may be a notebook computer or hand held computer in addition to taking the form of a PDA. Data processing system 200 also may be a kiosk or a Web appliance.

The processes of the present invention are performed by processor 202 using computer implemented instructions, which may be located in a memory such as, for example, main memory 204, memory 224, or in one or more peripheral devices 226-230.

The present invention is directed to a method, system and computer program product for generating effective addresses in a data processing system such as data processing system 200 in FIG. 2. The present invention is especially suitable for generating effective addresses in a Content-Addressable Memory (CAM)-based effective address translation design in a multi-threaded environment, although it should be understood that it is not intended to limit the invention to any particular effective address translation design or to any particular environment. As discussed previously, a CAM-based effective address translation design has been found to perform well, especially in a multi-threaded environment where the utilization of each thread varies dynamically between 0, 50% and 100%. Such a CAM-based effective address translation design, however, requires that all of the bits of the effective address be present at the same time. The present invention permits effective addresses to be generated more quickly while maintaining the overall performance advantages realized by a CAM-based effective address translation scheme.

Figure 3A:
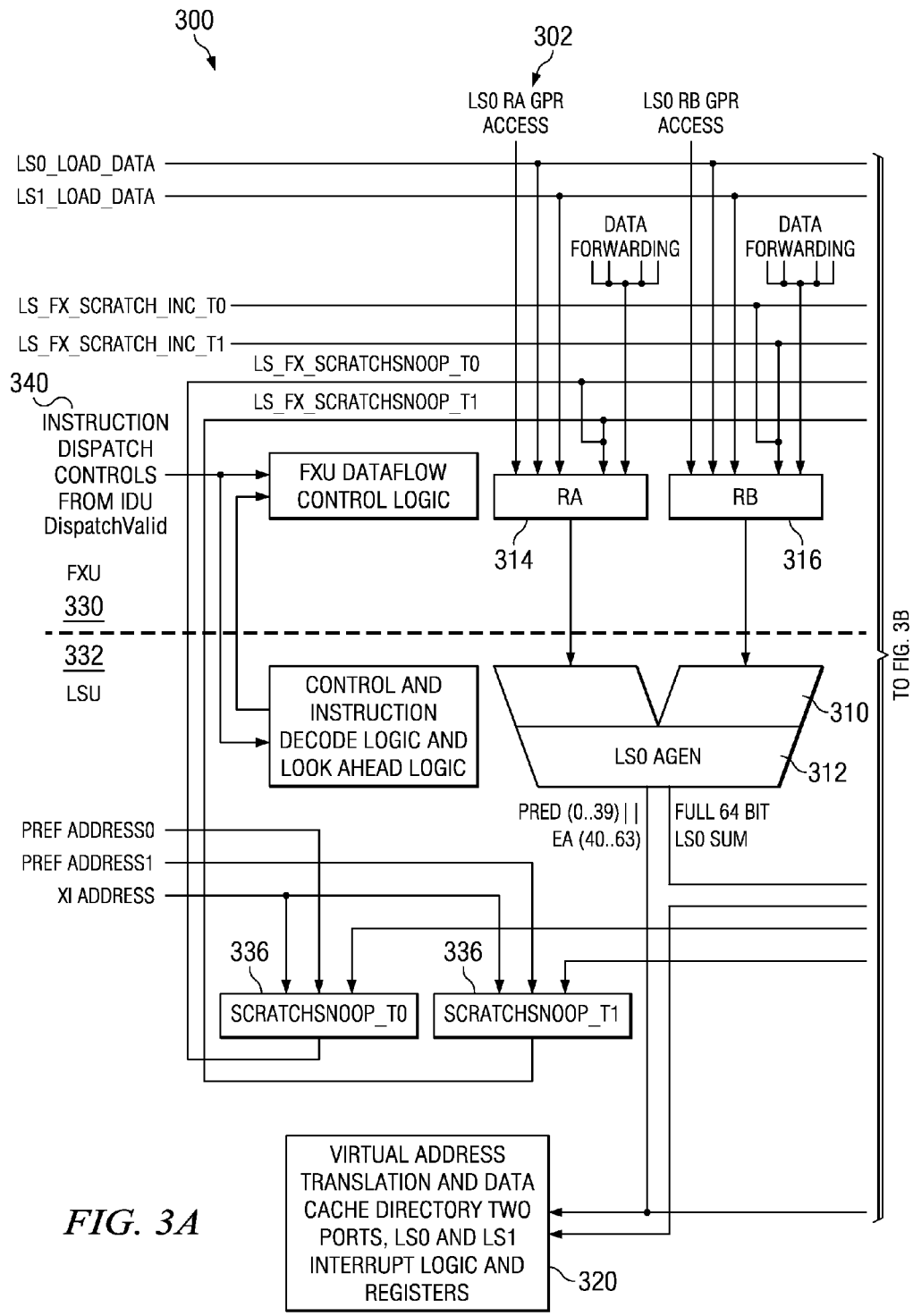
FIGS. 3A and 3B illustrate a block diagram of a system for generating effective addresses in a data processing system according to a preferred embodiment of the present invention.
Figure 3B:
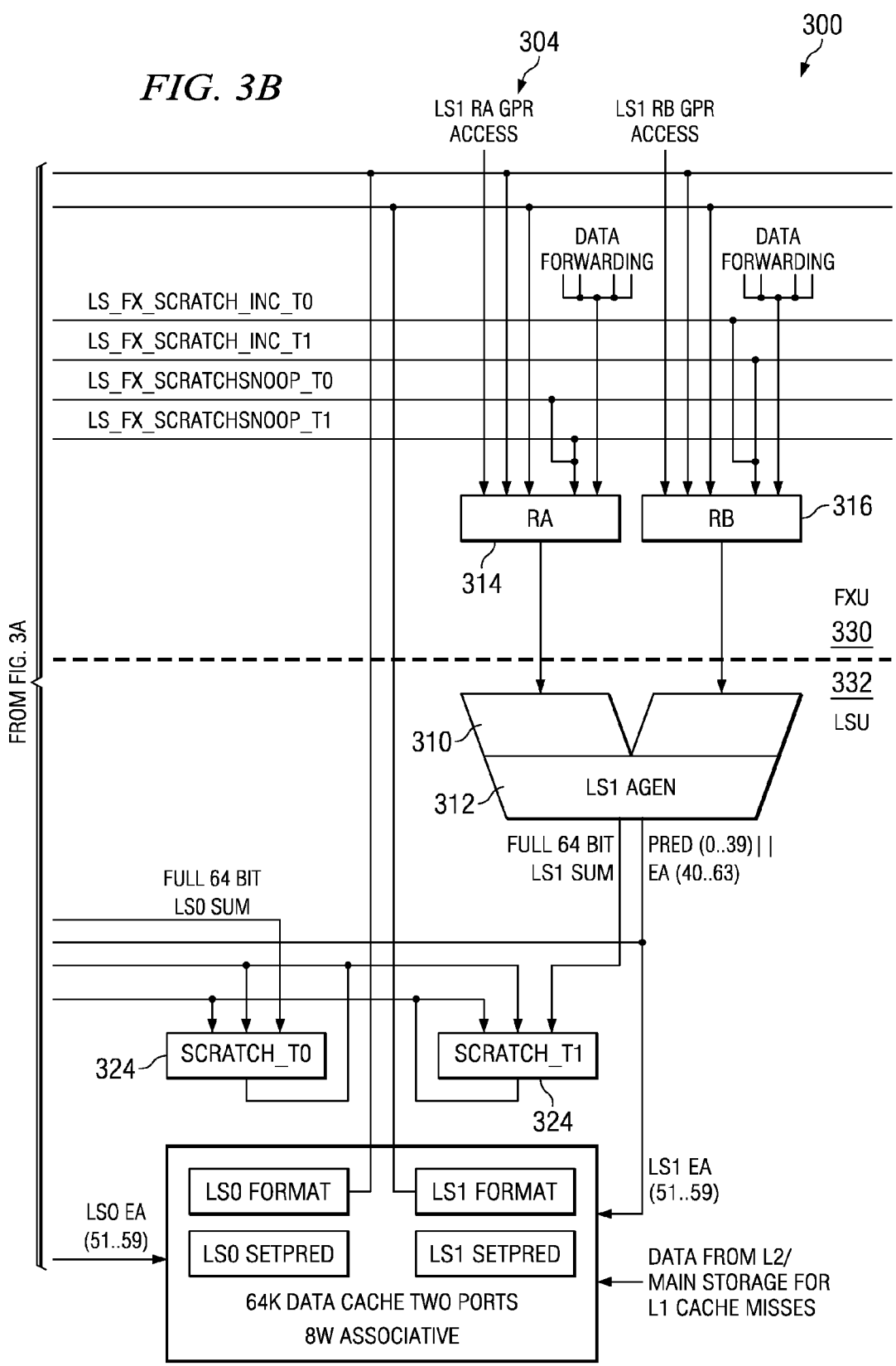

FIGS. 3A and 3B illustrate a block diagram of a system for generating effective addresses in a data processing system according to a preferred embodiment of the present invention. The system is generally designated by reference number 300 and comprises a system incorporating a multi-threaded design having two threads, although the invention is not limited to a two-threaded design.

In system 300 illustrated in FIGS. 3A and 3B, an effective address has 64 effective address bits. According to the present invention, an effective address is generated by calculating a first plurality of effective address bits in an adder, and guessing a second plurality of effective address bits using a mux (multiplexer). By intelligently guessing a plurality of the effective address bits, the effective address can be generated and sent to a translation unit more quickly than in a system in which all address bits are calculated.

A mux 310 is provided in each address generation (AGEN) pipeline 302, 304 of system 300. Each mux is preferably situated at the earliest possible point in the pipelines, and as shown in FIGS. 3A and 3B, is incorporated in adders 312. In a preferred embodiment of the invention, 40 bits of the 64-bit effective address are generated with mux 310, and 24 bits of the effective address are generated with adder 312. The determination of which input to the adder to select as the mux output is based on the notion that the carry that may be generated from the least significant bits (LSBs) of the AGEN pipeline does not often cross into the range of bits considered to be most significant bits (MSBs). In the preferred embodiment, that boundary is bit 40 as that bit marks when the carry would cause the generated EA to cross into the next 16 MB aligned blocks of EAs. This is considered to be a rare event in an instruction stream. It should, however, be understood that the invention is not limited to defining bit 40 as the boundary.

The muxed result is either the A operand (0:39), also known as (RA), or the B operand (0:39), also known as (RB) as shown at 314 and 316, respectively, in FIGS. 3A and 3B. Given that an instruction set has deference as to whether RA or RB is to be considered as the "base" register, a clear choice can be made, that is to choose the RA value over the RB value. The only criteria needed to test are to be sure the RA value does exist in the instruction to be dispatched and that it is nonzero. This second criteria is needed if the instruction set allows for the implication of "zero" for a value given a particular GPR (General Purpose Register) register address (typically zero also). Thus, both criteria are available early in the AGEN pipeline, even before the RA and RB operands for the AGEN are formulated.

An equation is required to quickly determine when the 64 bit EA would be the same as the mux (40 bits) concatenated with the EA. The equation can be determined in parallel with the EA Guess (EAG) calculation, and is produced and sent to translation unit 320. The equation needs to be resolved in time to stop the instruction from completing in the Load/Store Unit (LSU), and create a "reject" condition back to the dispatch unit that will allow the instruction to be redispatched if it was discovered that the EA is wrong. This computation can be based largely on the AGEN operands, but will also need to know when the AGEN adder determined that there will be a carry out across the bit 40 boundary. Because, as described above, the instruction set has a deference for RA to be the chosen register, the test need only comprise logic to assure that (1) RB (0:39) is zero and that no carry out of bit 40 occurred in the AGEN, and (2) RB (0:39) is all ones and that a carry out of bit 40 did occur in the AGEN (the second term is used when the RB field is negative, if allowed by the instruction set).

As shown in FIGS. 3A and 3B, it should be understood that the above-mentioned hardware must be replicated in a multi-threaded environment one set per pipe, that is, one per instance of a LSU in the superscalar structure.

According to the present invention, a mechanism is required to correct the effective address generated by the mux and the adder when the effective address is determined to be wrong. According to a preferred embodiment of the present invention, a scratch register 324 is provided for each thread so that the correct effective address can be saved for future use if the guessed effective address is determined to be wrong.

If the guessed effective address sent to the translation CAM is incorrect, the scratch registers store the correct address as fully calculated and generated by adders 312. As shown in FIGS. 3A and 3B, the scratch registers are close to the adders, and are the only locations where the complete 64 bit address add needs to go inasmuch as all other usages of the EA use the guessed version of the EA that are sent to the translation CAM 320.

If the guessed effective address does not equal the 64 bit address, a reject mechanism is invoked to block the write back. In particular, the instruction dispatch unit (IDU), shown at 340 in FIGS. 3A and 3B, is given a reject for all load and store instructions by the LSU if the instruction needs to be redispatched and completed later. One of the reasons for rejecting an instruction would be that the EA guess was incorrect. Another would be that the instruction is unaligned. In a preferred embodiment of the invention, other rejects include L1 data cache miss for loads, and load-hit store if a load is fetching stale data matching a store that is in flight. If an LSU instruction is rejected, the rejected instruction and all instructions after the rejected instruction are blocked. The dispatch logic will redispatch the instruction, whereupon the corrected address is sent to the data flow forwarding unit (FXU) 330 to be redispatched to the Load/Store unit (LSU) 332. Because the scratch register contains the exact EA, when being redispatched, the FXU will direct the scratch register value into the RA side of the AGEN pipe, given that this is the same side the EAG mux logic has deference toward. Thus, it is only required that the scratch register control logic send 000's on the RB side to assure that on the second try, the effective address guess (EAG) will be correct.

The scratch register is also used for load and store multiple instructions. In this case, a workable design has the scratch register saving the base address of the load/store multiple, and using the other input of the address adder to point to the Nth word or doubleword of the load/store multiple instruction. This mechanism can also be used for load/store string, which also has multiple loads and stores in a single instruction. A load/store multiple may cross the 24 bit boundary in the middle of the instruction. The present invention requires that the mux EA guess then be corrected via a 40 bit incrementer, along with a modification to the equation which detects when the effective address mux guess is invalid. Once all load/stores having the initial 0 . . . 39 bit value are complete, bits 0 . . . 39 of the scratch register for that thread can be safely incremented.

Scratch register 324 can also be used for unaligned operations. According to the present invention, the second half of the unaligned operation is in a different cache line than the first. It may also cross the 0 . . . 39 guess boundary and require an increment. The same incrementer used for load/store multiple is used for that scenario, along with the same restrictions.

An issue to be addressed is how to send the control lines for using the scratch register mux out 2 cycles ahead of the AGEN calculation speculatively so as to meet control mux timing requirements. This is problematic because the thread is not known ahead of time. Also, it must be known when to increment the scratch register for the EA guess crossing problem, and how to handle instructions that have multiple usages of the scratch register.

According to a further aspect of the present invention, these problems are handled by having the FXU dataflow forwarding macro 330 handle the thread, while the LSU 332 with the scratch registers in it sends out the control lines without using the thread.

In general, as described above, the scratch register is used for load/store string/multiple, unaligned loads/stores crossing a cache line boundary, and for handling addresses whose EA(0:39) cannot be guessed. According to the present invention, a mechanism is provided for when to load the scratch register, rejecting when the scratch register is unavailable, and handling the control lines back to the FXU in such a manner that can detect when the scratch register should be selected. Additional scratch register functions for prefetch and cross cache invalidate checks can also be handled. In general, this is done to prevent adding multiplexers in the critical cache address path, and to handle the above-described functions in hardware rather than software. This aspect of the invention applies in particular to in order designs with long pipelines.

A lookahead sequencer is provided to track when instructions are speculative (after a reject). Speculative instructions are also used to allow prefetching after cache misses and translation misses. The lookahead sequencer stays in sync with the dispatch unit, so that redispatch of the instruction in question can be detected. This also allows knowing when the scratch register should be loaded from the load/store effective address adder.

The control lines to select the scratch register are sent to the FXU in a speculative manner. These control lines break the scratch register for the multiple pipelines into "select scratch register for thread 0" and "select scratch register for thread 1". Additional threads can also be handled. For load/store multiple/string operations, the size is also sent back (4 bytes or 8 bytes) so that the FXU knows whether the register number needs to be multiplied by 4 or 8 bytes prior to forming the increment for the scratch register. The size is also sent back for each thread, since LSU cannot know which thread will dispatch on any given cycle. A mechanism is also provided for load/store multiple to optimize when to allocate and when to stop using the scratch register.

The control lines are sent to the FXU speculatively in the D0 cycle, without knowing the value of dispatch valid. If dispatch is valid, then the scratch register is used.

Within the fixed point unit, there exists logic to handle various scenarios involving a scratchsnoop function. Often the thread indicated by the IDU does not line up with the thread of the instruction involving the scratchsnoop operation (the scratchsnoop operation is illustrated at 336 in FIGS. 3A and 3B). In such instances, confusion may occur about which parts of the scratch increment field are to be updated. To sort this out, the fixed point unit receives two pieces of information from the load/store unit. These are a one-bit thread field and a signal to indicate that the thread field is to be used by the fixed point unit instead of the thread field from the IDU. These cases include X1 string increments and unaligned increments. The unaligned increment portion of the scratch increment field is only to be updated in the case of the pipe matching the thread. X1 and stringn incrementing requires use of the load/store unit thread, but do not require the thread to match the pipe.

The scratch register is held until a load/store is known to not be rejecting; the lookahead sequencer is critical for preventing hangs and allowing the oldest instruction to get to the scratch register.

FIG. 4 is a flowchart that illustrates a method for generating effective addresses in a data processing system according to a preferred embodiment of the present invention. The method is generally designated by reference number 400 and begins by generating a first portion of the effective address by calculating a first plurality of effective address bits of the effective address (Step 402), and generating a second portion of the effective address by guessing a second plurality of effective address bits of the effective address (Step 404). The guessed generated effective address is then sent to a translation unit (Step 406). A determination is then made whether the guessed generated effective address is correct (Step 408). If it is correct, (Yes output of Step 408), the method ends. If the guessed generated effective address is incorrect (No output of Step 408), the translation unit is instructed to ignore the translation miss and instruct the dispatch unit to redispatch the instruction (Step 410). The redispatch should be in order beginning with the oldest instruction, the instruction for which the effective address guess was incorrect. After the instruction is dispatched, the scratch register is used to calculate the effective address (Step 412), the calculated effective address is sent to the translation unit (Step 414), and the method ends.

The present invention thus provides a method, system and computer program product for generating effective addresses in a data processing system. A method, in a data processing system, for generating an effective address according to the invention includes generating a first portion of the effective address by calculating a first plurality of effective address bits of the effective address, and generating a second portion of the effective address by guessing a second plurality of effective address bits of the effective address. By intelligently guessing a plurality of the effective address bits that form the effective address, the effective address can be generated and sent to a translation unit more quickly than in a system in which all the effective address bits of the effective address are calculated. The invention is particularly suitable for generating effective addresses in a CAM-based effective address translation design in a multi-threaded environment.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A system for generating an effective address, comprising:
    a dispatch unit for dispatching an instruction;
    an adder for generating a first portion of the effective address for the instruction by calculating a first plurality of effective address bits of the effective address;
    a multiplexer for generating a second portion of the effective address for the instruction by guessing a second plurality of effective address bits of the effective address to form a guessed generated effective address for the instruction;
    a mechanism for sending the guessed generated effective address to a translation unit;
    a mechanism for determining whether the guessed generated effective address is correct;
    responsive to determining that the guessed generated effective address is not correct;
    a mechanism for invoking a reject for all load and store instructions;
    a mechanism for instructing the translation unit to ignore the guessed generated effective address;
    a mechanism for redispatching the instruction for which the guessed generated effective address was not correct;
    a mechanism for generating a calculated effective address for the instruction by
    calculating all effective address bits of the effective address to form a calculated generated effective address;
    scratch registers for storing the calculated generated effective address; and
    a mechanism for sending the generated calculated effective address from the scratch registers to the translation unit.

2. The system according to claim 1, wherein the effective address comprises sixty-four effective address bits, and wherein the first plurality of effective address bits comprises twenty-four bits, and wherein the second plurality of effective address bits comprises forty bits.

3. The system according to claim 1, wherein the system comprises a content addressable memory (CAM)-based effective address translation design in a multi-threaded environment.

4. A computer program product in a recordable-type computer readable medium for generating an effective address, comprising:
    first instructions for dispatching an instruction;
    second instructions for generating a first portion of the effective address for the instruction by calculating a first plurality of effective address bits of the effective address using an adder;
    third instructions for generating a second portion of the effective address for the instruction by guessing a second plurality of effective address bits of the effective address using a multiplexer to form a guessed generated effective address for the instruction;
    fourth instructions for sending the guessed generated effective address to a translation unit;
    fifth instructions for determining whether the guessed generated effective address is correct;
    responsive to determining that the guessed generated effective address is not correct;
    sixth instructions for invoking a reject for all load and store instructions;

seventh instructions for instructing the translation unit to ignore the guessed generated effective address;

eighth instructions for redispatching the instruction for which the guessed generated effective address was not correct;

ninth instructions for generating a calculated effective address for the instruction by calculating all effective address bits of the effective address to form a calculated generated effective address;

tenth instructions for storing the calculated generated effective address in scratch registers; and eleventh instructions for sending the generated calculated effective address from the scratch registers to the translation unit.

5. The computer program product according to claim 4, wherein the effective address comprises sixty-four effective address bits, and wherein the first plurality of effective address bits comprises twenty-four bits, and wherein the second plurality of effective address bits comprises forty bits.

* * * * *